United States Patent [19]
Ochiai

[11] Patent Number: 4,935,675
[45] Date of Patent: Jun. 19, 1990

[54] HORIZONTAL OUTPUT CIRCUIT
[75] Inventor: Masashi Ochiai, Saitama, Japan
[73] Assignee: Kabushiki Kaisha Toshiba, Kawasaki, Japan
[21] Appl. No.: 389,675
[22] Filed: Aug. 4, 1989
[30] Foreign Application Priority Data
  Sep. 26, 1988 [JP] Japan .................. 63-240241
[51] Int. Cl.⁵ ............................. H01J 29/56
[52] U.S. Cl. ................................. 315/371
[58] Field of Search ................. 315/370, 371, 408
[56] References Cited
  U.S. PATENT DOCUMENTS
  3,906,305  9/1975  Nillesen ................. 315/408
  4,254,365  3/1981  Knight .................. 315/371
  4,482,846 11/1984  Worster ................. 315/371
  4,733,141  3/1988  Watanuki ................ 315/371

FOREIGN PATENT DOCUMENTS
  57-39102   8/1982  Japan .
  60-44862  10/1985  Japan .

Primary Examiner—Gregory C. Issing
Attorney, Agent, or Firm—Cushman, Darby & Cushman

[57] ABSTRACT

In this invention, a signal from a modulating source is applied to a parallel circuit consisting of a diode and capacitor connected between the emitter of a horizontal output transistor and a reference potential point and the discharged current of the above mentioned capacitor is modulated to be parabolic in a vertical cycle to thereby correct a pincushion distortion. A series circuit of a horizontal deflecting coil and first and second S-distortion correcting capacitors is connected between the collector and emitter of a horizontal output transistor. Further, a second series circuit consisting of a coil and capacitor is connected to the connecting point of the above mentioned S-distortion correcting capacitors. By such formation, at the time of receiving a white peak signal, the voltage at both ends of the capacitor controlled by the modulating source will become smaller, will operate to cancel the fluctuation (distortion) of the deflecting current by the reduction of the high voltage and will reduce the distortion produced by a discontinuous phenomenon of the deflecting current in the conventional circuit.

17 Claims, 5 Drawing Sheets

HORIZONTAL OUTPUT CIRCUIT

BACKGROUND OF THE INVENTION

1. Field of the Invention

This invention relates to a horizontal output circuit for correcting a pincushion distortion and more particularly to improvements made to correct a horizontal distortion produced by a secondary side load fluctuation of a flyback transformer.

2. Related Art Statement

In the deflection of a picture tube or cathode ray tube (CRT) in an ordinary color television receiver, on the basis of the noncoincidence of the curvature center and deflection center of the fluorescent screen, the raster on the fluorescent screen will be distorted in a pincushion fashion.

The pincushion distortion is corrected by increasing the horizontal amplitude as the vertical scanning center is approached. That is to say, it is corrected by parabolically amplitude-modulating the envelope of the horizontal deflecting current in the vertical cycle.

Figure 1:
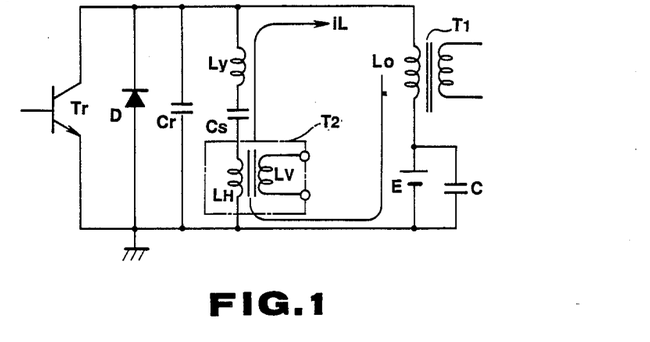
FIG. 1 is a circuit diagram showing a conventional output circuit.

FIG. 1 shows an example of a horizontal output circuit having a conventional pincushion distortion correcting function. In the formation of this circuit, a driving pulse of a horizontal cycle is input into the base of a horizontal output transistor Tr, a damper diode D and resonant capacitor Cr are connected in paralled between the collector and emitter and further a series circuit of a horizontal deflecting coil Ly, S-distortion correcting capacitor (direct current blocking capacitor) Cs and secondary coil LH of a transformer $T_2$ is connected in parallel. The collector of the transistor Tr is connected to a direct current source E through the primary coil $L_0$ of a transformer $T_1$. A current source decoupling capacitor C is connected in parallel with the direct current source E. The above mentioned transformer $T_2$ is a pincushion distortion correcting transformer and a parabolic driving current of a vertical cycle is flowed through its primary coil $L_v$. By the way, this driving current is obtained by integrating the voltage of a vertical deflecting coil in an integrating circuit, shaping the waveform and feeding the voltage to the coil $L_v$. The above mentioned transformer $T_1$ is a flyback transformer and its secondary side winding feeds a high voltage to a CRT anode through a rectifying circuit not illustrated.

In the circuit of the above mentioned FIG. 1, when a parabolic current of a vertical cycle is flowed through the above mentioned coil $L_v$, the inductance of a coil $L_H$ connected in series with the horizontal deflecting coil $L_y$ will parabolically vary and the envelope of the horizontal deflecting current will be able to be parabolically amplitude-modulated in the vertical cycle.

However, in the circuit using the correcting transformer in FIG. 1, in case a large correction amount is required, the variation of the inductance of the coil $L_H$ will have to be made large, therefore the high voltage ripple obtained by the rectification in the secondary side high voltage rectifying circuit of the flyback transformer $T_1$ will increase and a raster distortion by this ripple will be produced. Further, in the above mentioned circuit, there are such defects that the correcting transformer will be saturated with the horizontal deflecting current, the horizontal linearity will deteriorate and the correction amount will become non-uniform depending on the horizontal direction.

Figure 2:
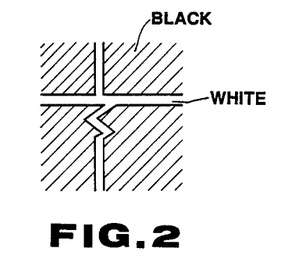
FIGS. 2 and 3 are explanatory views of distortions produced by the circuit in FIG. 1.
Figure 3:
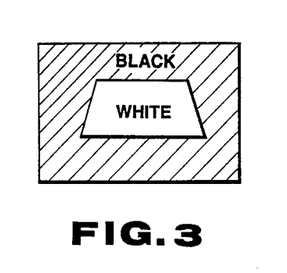

Further, in the circuit shown in FIG. 1, in case a white peak signal is received as a video signal, the load current on the secondary side of the flyback transformer $T_1$ will increase and, under its influence, a current iL will flow on the primary side and will vary the horizontal deflecting current. FIG. 2 shows an example of a figure distorion by the above mentioned variation of the horizontal deflecting current. In the cross pattern by a white signal, the vertical line after the white horizontal line is reproduced is bent in the horizontal direction. Also, by the reduction of the secondary side high voltage, the rectangular picture image to be displayed on the picture surface will be distorted to be trapezoidal as shown in FIG. 3.

Further, in the circuit in FIG. 1, the pincushion distortion in the horizontal (right and left) direction is corrected by a constant parabolic information. However, depending on the CRT, the distortions outside and inside the Picture surface may be different and the inside distortion may be larger. In such case, the distortion will be more remarkable inside the picture surface. However, in the circuit in FIG. 1, such distortion can not be coped with.

Figure 4:
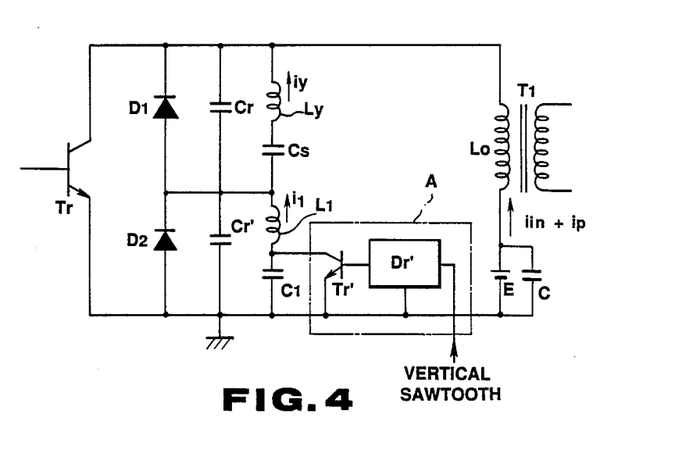
FIG. 4 is a circuit diagram showing another conventional example.

On the other hand, there is such conventional example of a horizontal output circuit wherein a distortion is corrected without using a pincushion distortion correcting transformer as is shown in FIG. 4. This horizontal output circuit is mentioned in U.S. Pat. No. 3,906,305. In FIG. 4, a pulse of a horizontal cycle is input into the base of a horizontal output transistor $T_r$, a series circuit of the first and second damper diodes $D_1$ and $D_2$ is connected in parallel between its collector and emitter, further first and second resonant capacitors $C_r$ and $C_r'$ are connected in parallel with the respective diodes $D_1$ and $D_2$, a series circuit of a horizontal deflecting coil $L_y$ and S-distortion correcting capacitor $C_s$ is connected in parallel with the capacitor $C_r$ a series circuit of a coil $L_1$ and capacitor $C_1$ is connected in parallel with the capacitor $C_r'$, the voltage from a d.c. voltage source E is to be given to the collector of the transistor $T_r$ through the primary coil $L_0$ of the transformer $T_1$ and a modulating source A is connected in parallel with the above mentioned capacitor $C_1$. The modulating source A is to feed a vertical sawtooth wave signal fed as an input to the base of a transistor $T_r'$ through a driving stage $D_r'$ to obtain a parabolically varying control signal between the collector and emitter of the transistor $T_r'$. By applying this control signal to both ends of the capacitor $C_1$, the pincushion distortion of the horizontal deflecting current $i_y$ is corrected. By the way, a current source decoupling capacitor C is connected in parallel with the d.c. voltage source E.

In the circuit in FIG. 4, at the time of starting scanning, the diodes $D_1$ and $D_2$ will conduct. During the scanning period, the capacitor $C_s$ will become a power source of the deflecting coil $L_y$ and the capacitor $C_1$ will become a power source of the coil $L_1$ and therefore, by the conduction of the diodes $D_1$ and $D_2$, a sawtooth wave current will flow through the coils $L_y$ and $L_1$ and the current $i_y$ flowing through the coil $L_y$ will be a deflecting current.

Before the middle of the scanning period is reached, a control signal (on pulse) will be fed to the base of the transistor $T_r$ to conduct the transistor $T_r$. Thereby, substantially in the middle of the scanning cycle, the coil current will reverse the direction. In case the current $i_y$ is larger than the current $i_1$ flowing through the coil $L_1$, the current $i_y$ will flow through the transistor $T_r$ and its difference current $i_y - i_1$ will flow through the diode $D_2$. In this case, the diode $D_1$ will not conduct. In case the current $i_1$ is larger than the current $i_y$, a current amount corresponding to the current $i_1$ will flow through the transistor $T_r$ and its difference current $i_1 - i_y$ will flow through the diode $D_1$. In this case, the diode $D_2$ will not conduct.

At the time of the end of the scanning peiod, the transistor $T_r$ and conducting diode $D_1$ or $D_2$ will be cut off and a blanking period will be entered. Therefore, the current which has been flowing to the transistor $T_r$ will now flow into resonant capacitors $C_r$ and $C_r'$ and a substantially sinusoidal wave-like resonant voltage will be generated between both terminals. The moment this voltage again becomes zero, the diodes $D_1$ and $D_2$, will simultaneously begin to conduct and a new scanning period will begin.

Figure 5:
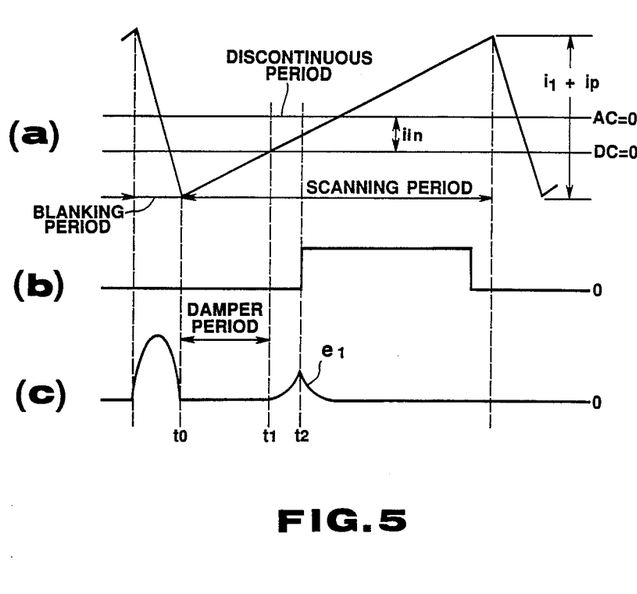
FIG. 5 is an explanatory view for explaining the circuit operation in FIG. 4.
Figure 6:
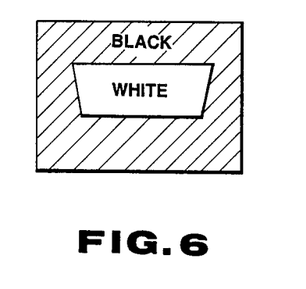
FIG. 6 is an explanatory view of a picture image distortion produced by the circuit in FIG. 4.

In the above mentioned circuit, the high voltage ripple on the secondary side of the flyback transformer is controlled by the flowing of the above mentioned difference current $i_1 - i_y$. Now, in the circuit in FIG. 4, if the alternating current flowing through the primary side of the flyback transformer $T_1$ is represented by $i_p$, the direct current is represented by $i_{in}$ and the alternating current flowing through the coil $L_1$ is represented by $i_1$, the current $i_p + i_1 + i_{in}$ will represent a deflecting current $i_y$ as shown in FIG. 5(a). Here, it is considered that a white square wave video signal is received and a white peak current flows through the secondary side of the flyback transformer $T_1$. Then, the direct current $i_{in}$ flowing through the primary side of the transformer $T_1$ will be increased by the above mentioned white peak current. At this time, in case, at the time $t_1$ before the time $t_2$ when such on-pulse as is shown in FIG. 5(b) enters the base of the horizontal output transistor $T_r$, the damper diode $D_1$ ($D_2$) is "OFF" and the deflecting current becomes zero, such discontinuous pulse $e_1$ will be generated as shown in FIG. 5(c) in both end voltages $V_{cr}'$ of the second resonant capacitor $C_r'$. At this time, the pulse $e_1$ will operate to reduce the average value $\overline{V}_{cs}$ of both end voltages $V_{cs}$, because $\overline{V}_{cs} + \overline{V}_{cr}' = E$. Therefore, when a white square wave signal is input into the CRT, from above a certain signal level, the voltage $\overline{V}_{cs}$ will gradually reduce in response to the horizontal output circuit and the rectangular picture image to be displayed on the picture surface will be distorted to be inverted trapezoidal as shown in FIG. 6. Also, in the circuit shown in FIG. 4, it is necessary that, on the first circuit network consisting of the parallel connections of the $L_y$, $C_r$ and $D_1$ and the second circuit network consisting of the parallel connections of the $L_1$, $C_r'$ and $D_2$, the respective blanking periods should end simultaneously and the constants shold be selected so that $L_y \cdot C_r = L_1 \cdot C_r'$ and it is difficult to determine the circuit constants so as to satisfy this relation and the picture surface linearity correcting amount (pincushion distortion correcting amount).

By the way, a horizontal output circuit whereby a pincushion distortion is corrected without using a correcting transformer is suggested in each of U.S. Pat. Nos. 4,254,365, 4,733,141 and 4,482,846 but, by either of the suggestions, the trapezoidal distortion at the time of receiving the above described white peak signal has not been able to be corrected.

SUMMARY OF THE INVENTION

The present invention is to eliminate the above mentioned problems and has it as an object to provide a horizotal output circuit having a function of correcting a pincushion distortion and the like without producing a trapezoidal distortion at the time of receiving a white peak signal.

That is to say, a mode of a horizontal output circuit according to the present invention is a horizontal output circuit characterized by comprising:

a horizontal output transistor having a base, emitter and collector, fed with a drive pulse of horizontal cycle to the base and having the collector connected to a d.c. voltage source through a choke coil;

a first series circuit of a horizontal deflecting coil and first and second capacitors connected in parallel between the collector and emitter of this horizontal output transistor;

a first diode and third capacitor connected in parallel between the collector and emitter of the above mentioned horizontal output transistor;

a fourth capacitor connected between the collector of the above mentioned horizontal output transistor and a reference potential point;

a second series circuit consisting of a third coil and fifth capacitor connected between the connecting point of the above mentioned first and second capacitors and a direct current source;

a parallel circuit consisting of a second diode connected inversely in series with the above mentioned first diode between the emitter of the above mentioned horizontal output transistor and the reference potential point and a sixth capacitor connected in parallel with this diode;

a smoothing circuit consisting of a fourth coil and seventh capacitor connected to both ends of the above mentioned sixth capacitor of this parallel circuit; and a modulating source connected in parallel with the above mentioned seventh capacitor of this smoothing circuit and controlled with a signal representing a waveform information of a vertical cycle.

A second mode of the present invention is a horizontal output circuit characterized by comprising:

a horizontal output transistor having a base, emitter and collector, fed with a driving pulse of a horizontal cycle to the base and having the collector connected to a d.c. voltage source through a choke coil;

a first series circuit of a horizontal deflecting coil and first and second capacitors connected in parallel between the collector and emitter of this horizontal output transistor;

a first diode and third capacitor connected in parallel between the collector and emitter of the above mentioned horizontal output transistor;

a second series circuit of a third coil and fifth capacitor connected between the connecting point of the above mentioned first and second capacitors and a reference potential point;

a parallel circuit consisting of a second diode connected inversely in series with the above mentioned first diode between the emitter of the above mentioned horizontal output transistor and the reference potential point and a sixth capacitor connected in parallel with this diode;

a fifth coil connected at one end to the emitter of the above mentioned horizontal output transistor; and a modulating source connected between the other end of this fifth coil and the reference potential point and controlled with a signal representing a waveform information of a vertical cycle.

A third mode of the present invention is a horizontal output circuit characterized by comprising:

a horizontal output transistor having a base, emitter and collector, fed with a driving pulse of a horizontal period to the base and having the collector connected to a d.c. voltage source through the primary coil of a flyback transformer;

a first series circuit of a horizontal deflecting coil and first and second capacitors connected in parallel betwen the collector and emitter of this horizontal output transistor;

a first diode and third diode connected in parallel between the collector of the above mentioned horizontal output transistor and a reference potential point a second series circuit consisting of a third coil and fifth capacitor connected between the connecting point of the above mentioned first and second capacitors and the third coil of the above mentined flyback transformer a parallel circuit consisting of a second diode connected inversely in series with the above mentioned first diode between the emitter of the above mentioned horizontal output transistor and the reference potential point and a sixth capacitor connected in parallel with this diode;

a smoothing circuit consisting of a fourth coil and seventh capacitor connected to both ends of the above mentioned sixth capacitor of this parallel circuit; and a modulating source connected in parallel with the above mentioned seventh capacitor of this smoothing circuit and controlled with a signal representing a waveform information of a vertical cycle.

DETAILED DESCRIPTION OF THE PREFERRED EMBODIMENTS

Figure 7:
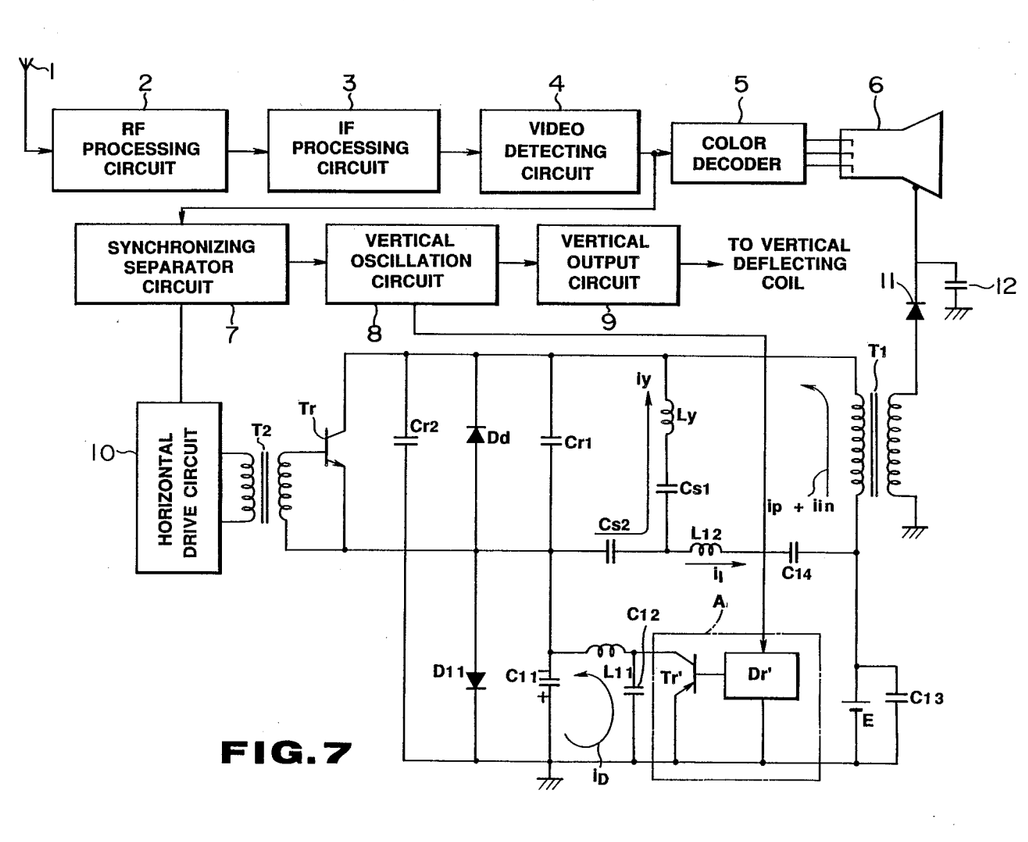
FIG. 7 is a circuit diagram showing a horizontal output circuit of an embodiment of the present invention.

In FIG. 7, first of all, the other formation than of the horizontal output step shall be described. A television signal received by an antenna 1 is selected by such high frequency (RF) processing circuit 2 as a tuner, is amplified by an intermediate frequency (IF) processing circuit 3 and is fed to a color decoder 5 reproducing color signals through a video detecting circuit 4 and the reproduced three primary color signals are fed to the cathode of a color picture tube 6. On the other hand, the output of a video detecting circuit 4 is fed to a synchronizing separator circuit 7. The separated vertical synchronizing signal excites a vertical oscillation circuit 8 and a vertical output circuit 9 is driven by the oscillated output. The vertical output circuit 9 feeds a vertical deflecting current to a vertical deflecting coil. The synchronized separated horizontal synchronizing signal excites a horizontal drive circuit 10 and the horizontal drive output is fed to the primary side of a drive transformer $T_2$. A horizontal output circuit is connected to the secondary side of the drive transformer $T_2$.

The formation of the horizontal output circuit shall be explained in the following. A drive pulse of a horizontal cycle from the drive transformer $T_2$ is to be input into the base of the horizontal output transistor $T_r$. Between the collector and emitter of the transistor $T_r$, a damper diode $D_d$ and first resonant capacitor $C_{r1}$ are connected in parallel and further a series circuit of a horizontal deflecting coil $L_y$, first S-distortion correcting capacitor $C_{s1}$ and second S-distortion correcting capacitor $C_{s2}$ is connected in parallel. A direct current source E is connected to the collector of the transistor $T_r$ through the primary winding (or choke coil) of a flyback transformer $T_1$. A second resonant capacitor $C_{r2}$ is connected between the collector of the horizontal output transistor $T_r$ and a reference potential point. Further, a series circuit of a coil $L_{12}$ and capacitor $C_{14}$ is connected between the connecting point of the first S-distortion correcting capacitor $C_{s1}$ and second S-distortion correcting capacitor $C_{s2}$ and a d.c. voltage source. Further, a parallel circuit of a diode $D_{11}$ and capacitor $C_{11}$ is connected between the emitter of the above mentioned transistor $T_r$ and the reference potential point. The diode $D_{11}$ has the cathode connected to the reference potential point so as to be inversely directed to the above mentioned damper diode $D_d$. Further, a series circuit of a smoothing coil $L_{11}$ and capacitor $C_{12}$ is connected in parallel with both ends of the above mentioned capacitor $C_{11}$. A modulating source A is connected in parallel with a smoothing capacitor $C_{12}$. This modulating source A converts a sawtooth wave signal from a vertical oscillation circuit 8 to a parabolic wave signal through a driving step $D_r'$ and then feeds it to the base of a transistor $T_r'$. The collector of the transistor $T_r'$ is connected to the connecting point of the above mentioned coil $L_{11}$ and capacitor $C_{12}$ and the emitter is connected to the reference potential point. By the way, a current source decoupling capacitor $C_{13}$ is connected in parallel with a direct current source E and the secondary side of the flyback transformer $T_1$ is connected to the anode of the picture tube 6 through a rectifying diode 11 and a capacitor 12 having a smoothing operation.

The operation of the above mentioned circuit shall be explained in the following.

After the beginning of the scanning period, the damper diode $D_d$ conducts and the voltage with which the first and second S-distortion correcting capacitors $C_{s1}$ and $C_{s2}$ are charged is fed to the horizontal deflecting coil $L_y$. Therefore, in the damper period, a horizontal deflecting current $i_y$ flows in the direction reverse to the illustrated direction through the coil $L_y$ and diode $D_d$. Then, before the middle of the scanning period is reached after the damper period, an on-pulse is fed to the base of the horizontal output transistor $T_r$ and therefore the current $i_y$ flows through the transistor $T_r$. In the middle of the scanning period, the current $i_y$ reverses the direction and flows in the reversed direction (illustrated direction) until the scanning period ends. When the scanning period ends and the transistor $T_r$ is off, the horizontal output circuit will enter a parallel resonance and the current $i$, will flow into and charge the first and second resonant capacitors $C_{r1}$ and $C_{r2}$. After the completion of the charging, the current is discharged and flows in the direction reverse to the coil $L_y$ out of the capacitors $C_{r1}$ and $C_{r2}$ to form a blanking period. After the end of the blanking period, the damper diode $D_d$ conducts again and a scanning period begins.

Figure 8:
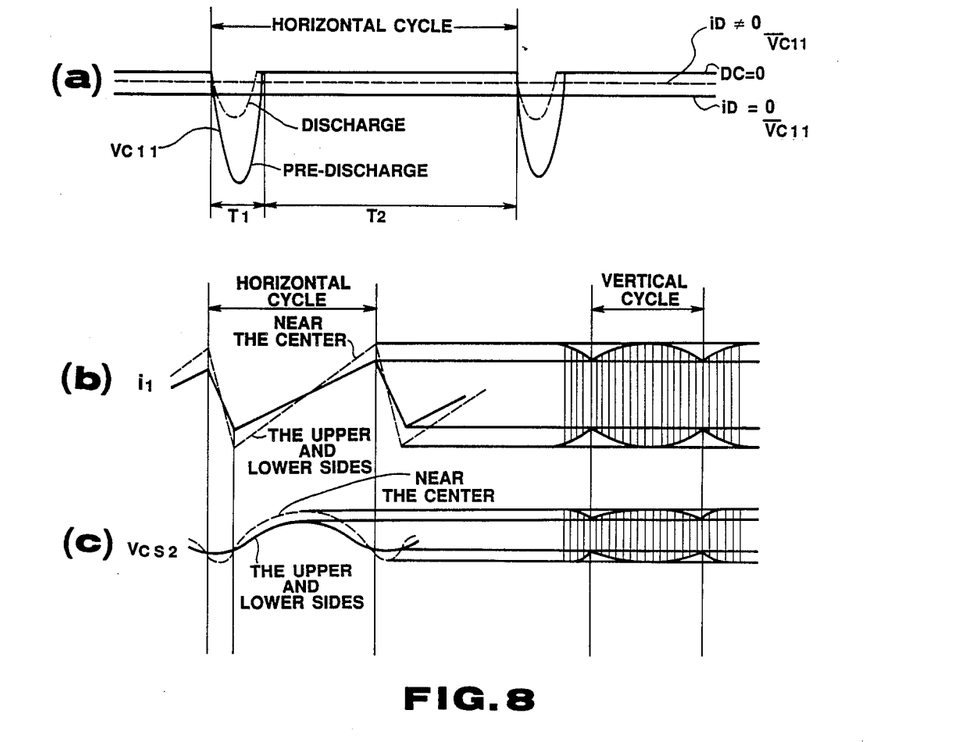
FIGS. 8 to 10 are explanatory views for explaining the circuit operation in FIG. 1.
Figure 9:
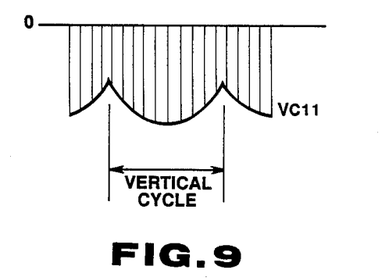

Now, in the above mentioned circuit, a current $i_p+i_{in}+i_{io}$ of the addition of an alternating current $i_p$, direct current $i_{in}$ and alternating current $i_o$ from the primary side of the flyback transformer $T_1$ flows through the parallel circuit of the capacitor $C_{11}$ and diode $D_{11}$. In the period (corresponding to the period $T_2$ in FIG. 8(a)) when the current $i_p+i_{in}+i_D$ is positive, the current $i_p+i_{in}+i_D$ will flow to the reference potential point through the diode $D_{11}$ and therefore the voltage $V_{c11}$ at both ends of the capacitor $C_{11}$ will be zero. Also, in the period (corresponding to the period $T_1$ in FIG. 8(a)) when the current $i_p+i_{in}+i_D$ is negative, the diode $D_{11}$ will be off and the voltage at both ends of the capacitor $C_{11}$ will be a negative voltage $(-V_{c11})$ FIG. 8(a) shows a variation of the voltage $V_{c11}$ at both ends of the capacitor $C_{11}$ in a horizontal cycle. The sum of the average value $-\overline{V}_{c11}$ of this $-V_{c11}$ and the average value $\overline{V}_{cs1}+\overline{V}_{cs2}=\overline{V}_{cs}$ of the voltages $(V_{cs1}+V_{cs2})$ at both ends of the S-distortion correcting capacitors $C_{s1}$ and $C_{s2}$ is equal to the current source voltage E and the relation of $\overline{V}_{cs}+(-\overline{V}_{c11})=E$ is established. Here, when the voltage $V_{c11}$ at both ends of the capacitor $C_{11}$ is discharged through the smoothing choke $L_{11}$, capacitor $C_{12}$ and modulating source A, by the discharged current $i_D$, the voltage $-V_{c11}$ will become smaller as in the broken line from the solid line (before the discharge) in FIG. 8(a). As a result, the average voltage $-\overline{V}_{c11}$ will also rise to the level of the broken line from the level of the solid line to be smaller. Therefore, the average value $\overline{V}_{cs}=E-(-\overline{V}_{c11})$ of the voltage at both ends of the S-distortion correcting capacitor will reduce and the horizontal deflecting current $i_y$ through the deflecting coil $L_y$ will also reduce. If the discharged current $i_D$ is made smaller, the $-\overline{V}_{c11}$ and $\overline{V}_{cs}$ will become larger and the horizontal deflecting current $i_y$ will also increase. From the above, when the discharged current $i_D$ of the capacitor $C_{11}$ is varied to be parabolic in the vertical cycle by the modulating source A, the horizontal deflecting current $i_y$ will be able to be varied to be parabolic in the vertical period and the pincushion distortion will be able to be corrected. By the way, the parabolic wave signal fed to the base of the transistor $T_r'$ from the driving stage $D_r'$ is of a negative potential and the emitter voltage of the horizontal output transistor $T_r$, that is, the voltage $V_{c11}$ at both ends of the capacitor $C_{11}$ is of a waveform modulated in the vertical cycle as shown in FIG. 9.

Figure 10:
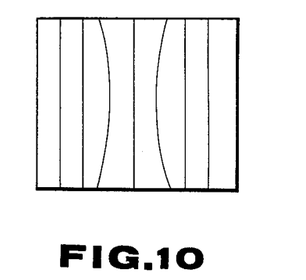

Also, the pincushion distortions inside and outside the picture surface are different depending on the CRT. In such case, if the correction is made with the same correcting amount, as shown in FIG. 10, the pincushion distortion will be made inside against outside the picture surface. In the present circuit, the S-distortion correcting capacitor is divided into two of the first and second S-distortion correcting capacitors $C_{s1}$ and $C_{s2}$ and a series circuit of a coil $L_{12}$ and capacitor $C_{14}$ is provided between the connecting point of the two S-distortion correcting capacitors $C_{s1}$ and $C_{s2}$ and the d.c. voltage source E to automatically correct the difference between the pincushion distortions in the horizontal direction.

That is to say, if the current flowing to the direct current voltage source through the second S-distortion correcting capacitor $C_{s2}$ and the series circuit of the coil $L_{12}$ and capacitor $C_{14}$ from the capacitor $C_{11}$ is represented by $i_1$, the current $i_1$ will flow in the direction shown in FIG. 7. The $i_1$ is a current of the waveform shown in FIG. 8(b). The sum $i_y+i_1$ of a deflection yoke current $i_y$ and this current $i_1$ flows through the second S-distortion correcting capacitor $C_{s2}$ and such parabolic voltage $V_{cs2}$ of the horizontal cycle as is shown in FIG. 8(c) integrating $i_y+i_1$ is produced in the second S-distortion correcting capacitor $C_{s2}$. That is to say, the current $i_1$ varies in the size in proportion to the voltage $V_{c11}$ generated in the capacitor $C_{11}$ and therefore varies to be parabolic in the vertical cycle the same as the voltage $V_{c11}$. Therefore, the voltage $V_{cs2}$ obtained by integrating the voltage $(i_y+i_1)$ of the horizontal cycle produced in the second S-distortion correcting capacitor $C_{s2}$ is also modulated to be parabolic in the vertical cycle. By the above operation, the parabolic voltage $V_{cs2}$ of the horizontal cycle produced in the second S-distortion correcting capacitor $C_{s2}$ becomes maximum in the center of the picture surface (center of the vertical cycle), therefore the S-distortion is corrected vertically in the center of the picture surface, the horizontal outside of the picture surface contracts and the non-uniformity in the horizontal direction of the Pincushion distortion is eliminated.

According to the above mentioned circuit formation in FIG. 7, as no correcting transformer is used as in the circuit in FIG. 1, no raster distortion is produced by a high voltage ripple or the saturation of the transformer. Also, no discontinuous phenomenon is generated and no inverse trapezoidal distortion is produced as in the circuit in FIG. 4. This is because, when the secondary side load of the flyback transformer $T_1$ increases and the current $i_{in}$ flowing into the primary side increases, the voltage $-V_{c11}$ at both ends of the capacitor $C_{11}$ will rise in proportion to them but the fluctuation of the average voltage $-\overline{V}_{c11}$ will operate to cancel the raster distortion of such conventional circuit as is shown in FIGS. 2 and 3 and will make the distortion smaller. For example, if a white square wave signal is received, a trapezoidal distortion will be produced on the picture surface by the reduction of the high voltage but at this time the voltage $-V_{c11}$ at both ends of the capacitor $C_{11}$ will become smaller and, as a result, the voltage $V_{cs}$ at both ends of the S-distortion correcting capacitor $C_s$ will fall, the horizontal deflecting current $i_y$ will decrease and the above mentioned trapezoidal distortion will be made smaller.

Further, in the circuit shown in FIG. 4, the coil $L_1$, in the second circuit network is made to resonate with the second resonant capacitor $C_r'$ and it has been necessary to make $L_y\cdot C_r=L_1\cdot C_r'$ so as to be substantially the same as the resonance of the first circuit network. However, in the circuit of FIG. 7, the coil $L_{11}$ is used merely for smoothing and it is easy to select the constant (inductance).

Figure 11:
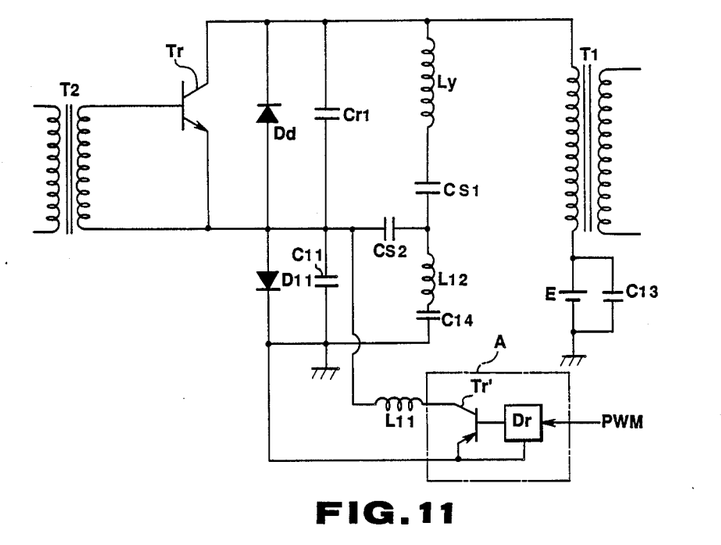
FIGS. 11 and 12 are circuit diagrams showing respectively other embodiments of the present invention.

By the way, the present invention is not limited to the above mentioned embodiments. As shown in FIG. 11, the second resonant capacitor $C_{r2}$ and capacitor $C_{12}$ of FIG. 1 connected between the collector and emitter of the horizontal output transistor $T_r$ may be eliminated, the capacitor $C_{14}$ may be connected in series with the coil $L_{12}$ and a PWM (pulse width modulating) signal may be fed as a control signal to the modulating source A. By the way, the PWM signal may be so processed as to be integrated in the driving stage $D_r$ to be a parabolic signal to be fed to the base of the transistor $T_r$.

Figure 12:
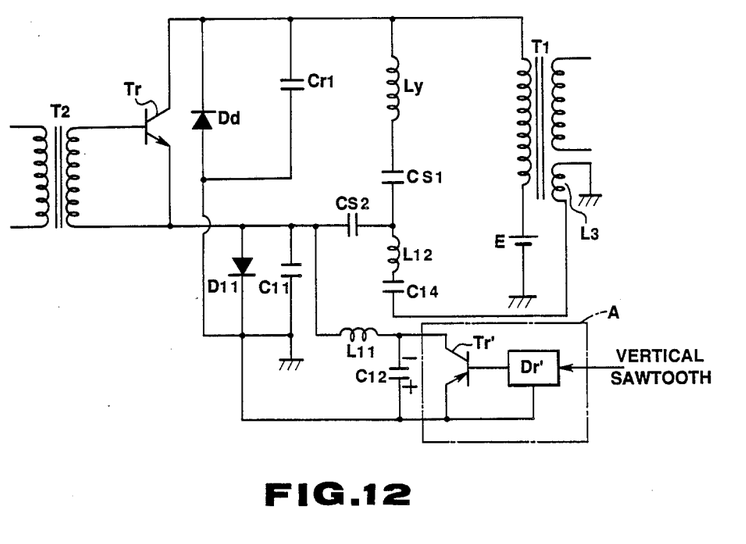

Also, as shown in FIG. 12, the second resonant capacitor $C_{r2}$ of FIG. 7 connected between the collector and emitter of the horizontal output transistor $T_r$ may be eliminated, the resonant capacitor $C_{r1}$ and damper diode $D_d$ may be connected in parallel between the collector of the horizontal output transistor $T_r$ and the reference potential point and the series circuit of the coil $L_{12}$ and capacitor $C_{14}$ may be connected to the third winding $L_3$ provided in the flyback transformer $T_1$.

What is claimed is:

1. A horizontal output circuit characterized by comprising:
   a horizontal output transistor having a base, emitter and collector, fed with a drive pulse of a horizontal cycle to the base and having the collector connected to a d.c. voltage source through a choke coil;
   a first series circuit of a horizontal deflecting coil and first and second capacitors connected in parallel between the collector and emitter of said horizontal output transistor;
   a first diode and third capacitor connected in parallel between the collector and emitter of said horizontal output transistor;
   a fourth capacitor connected between the collector of said horizontal output transistor and a reference potential point;
   a second series circuit consisting of a third coil and fifth capacitor connected between the connecting point of said first and second capacitors and a d.c. voltage source;
   a parallel circuit consisting of a second diode connected inversely in series with said first diode between the emitter of said horizontal output transistor and the reference potential point and a sixth capacitor connected in parallel with said diode;
   a smoothing circuit consisting of a fourth coil and seventh capacitor connected to both ends of said sixth capacitor of said parallel circuit; and
   a modulating source connected in parallel with said seventh capacitor of said smoothing circuit and controlled with a signal representing a waveform information of a vertical cycle.

2. A horizontal output circuit according to claim 1, characterized in that said first diode is a damper diode and said third capacitor is a resonant capacitor.

3. A horizontal output circuit according to claim 1, characterized in that said fourth capacitor is a resonant capacitor and said first and second capacitors are S-distortion correcting capacitors.

4. A horizontal output circuit according to claim 1, characterized in that said choke coil is a primary winding of a flyback transformer feeding a high voltage to the CRT, said d.c. voltage source is connected to said primary winding, said fifth capacitor is connected to this connecting point and said third coil is connected to the connecting point of said first capacitor and second capacitor.

5. A horizontal output circuit according to claim 1, characterized in that said modulating source includes a driving means fed with a vertical pulse from a vertical output means and outputting a parabolic signal of a vertical cycle and a second transistor fed with a signal from said driving means to the base and having the collector and emitter connected to the respective terminals of said seventh capacitor.

6. A horizontal output circuit according to claim 1, characterized in that said driving means of said modulating source is fed with a PWM signal and outputs a parabolic signal of a vertical cycle from this signal.

7. A horizontal output circuit characterized by comprising:
   a horizontal output transistor having a base, emitter and collector, fed with a drive pulse of a horizontal cycle to the base and having the collector connected to a d.c. voltage source through a choke coil;
   a first series circuit of a horizontal deflecting coil and first and second capacitors connected in parallel between the collector and emitter of said horizontal output transistor;
   a first diode and third capacitor connected in parallel between the collector and emitter of said horizontal output transistor;
   a second series circuit of a third coil and fifth capacitor connected between the connecting point of said first and second capacitors and a reference potential point;
   a parallel circuit consisting of a second diode connected inversely in series with said first diode between the emitter of said horizontal output transistor and the reference potential point and a sixth capacitor connected in parallel with said diode;
   a fifth coil connected at one end to the emitter of said horizontal output transistor; and
   a modulating source connected between the other end of said fifth coil and the reference potential point and controlled with a signal representing a waveform information of a vertical cycle.

8. A horizontal output circuit according to claim 7, characterized in that said first diode is a damper diode and said third capacitor is a resonant capacitor.

9. A horizontal output circuit according to claim 7, characterized in that said first and second capacitors are S-distortion correcting capacitors.

10. A horizontal output circuit according to claim 7, characterized in that said choke coil is a primary coil of a flyback transformer feeding a high voltage to the CRT.

11. A horizontal output circuit according to claim 7, characterized in that said modulating source includes a driving means fed with a vertical pulse from a vertical output means and outputting a parabolic signal of a vertical cycle and a second transistor having the collector connected to the other end of said fifth coil and having an emitter connected to the reference potential point.

12. A horizontal output circuit according to claim 7, characterized in that said driving means of said modulating source is fed with a PWM signal and outputs a parabolic signal of a vertical cycle from this signal.

13. A horizontal output circuit characterized by comprising:
   a horizontal output transistor having a base, emitter and collector, fed with a drive pulse of a horizontal cycle to the base and having the collector connected to a d.c. voltage source through a primary coil of a flyback transformer;
   a first series circuit of a horizontal deflecting coil and first and second capacitors connected in parallel between the collector and emitter of said horizontal output transistor;
   a first diode and third capacitor connected in parallel between the collector of said horizontal output transistor and a reference potential point;

a second series circuit consisting of a third coil and fifth capacitor connected between the connecting point of said first and second capacitors and a coil of said flyback transformer;

a parallel circuit consisting of a second diode connected inversely in series with said first diode between the emitter of said horizontal output transistor and the reference potential point and a sixth capacitor connected in parallel with said second diode;

a smoothing circuit consisting of a fourth coil and seventh capacitor connected to both ends of said sixth capacitor of said parallel circuit; and a modulating source connected in parallel with said seventh capacitor of said smoothing circuit and controlled with a signal representing a waveform information of a vertical cycle.

14. A horizontal output circuit according to claim 13, characterized in that said first diode is a damper diode and said third capacitor is a resonant capacitor.

15. A horizontal output circuit according to claim 13, characterized in that said first and second capacitors are S-distortion correcting capacitors.

16. A horizontal output circuit according to claim 13, characterized in that said modulating source includes a driving means fed with a vertical pulse from a vertical output means and outputting a parabolic signal of a vertical cycle and a second transistor fed with a signal from said driving means to the base and having the collector and emitter connected to the respective terminals of said seventh capacitor.

17. A horizontal output circuit according to claim 13, characterized in that said driving means of said modulating source is fed with a PWM signal and outputs a parabolic signal of a vertical cycle from this signal.

* * * * *